US009921602B2

(12) United States Patent
Chow et al.

(10) Patent No.: US 9,921,602 B2
(45) Date of Patent: Mar. 20, 2018

(54) METHODS OF COMPUTING STEADY-STATE VOLTAGE STABILITY MARGINS OF POWER SYSTEMS

(71) Applicant: RENSSELAER POLYTECHNIC INSTITUTE, Troy, NY (US)

(72) Inventors: Joe Hong Chow, Scotia, NY (US); Scott Gordon Ghiocel, Albany, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 350 days.

(21) Appl. No.: 14/655,474

(22) PCT Filed: May 7, 2014

(86) PCT No.: PCT/US2014/037092
§ 371 (c)(1),
(2) Date: Jun. 25, 2015

(87) PCT Pub. No.: WO2014/186187
PCT Pub. Date: Nov. 20, 2014

(65) Prior Publication Data
US 2015/0378387 A1    Dec. 31, 2015

Related U.S. Application Data

(60) Provisional application No. 61/822,955, filed on May 14, 2013, provisional application No. 61/833,949, filed on Jun. 12, 2013.

(51) Int. Cl.
*H02J 3/06* (2006.01)
*G05F 5/00* (2006.01)
(Continued)

(52) U.S. Cl.
CPC ............ *G05F 5/00* (2013.01); *G05B 19/048* (2013.01); *H02J 3/06* (2013.01); *H02J 4/00* (2013.01);
(Continued)

(58) Field of Classification Search
CPC .. H02J 2003/007; H02J 3/06; H02J 2003/001; H02J 13/0006; Y02E 60/76;
(Continued)

(56) References Cited

U.S. PATENT DOCUMENTS 4,974,140 A    11/1990   Iba
5,566,085 A    10/1996   Marceau et al.
(Continued)

FOREIGN PATENT DOCUMENTS

CN    102545206    7/2012
CN    103091581    5/2013
(Continued)

*Primary Examiner* — Ryan Johnson
(74) *Attorney, Agent, or Firm* — Notaro, Michalos & Zaccaria P.C.

(57) ABSTRACT

In steady-state voltage stability analysis, as load increases toward a maximum, conventional Newton-Raphson power flow Jacobian matrix becomes increasingly ill-conditioned so power flow fails to converge before reaching maximum loading. A method to directly eliminate this singularity reformulates the power flow problem by introducing an AQ bus with specified bus angle and reactive power consumption of a load bus. For steady-state voltage stability analysis, the angle separation between the swing bus and AQ bus can be varied to control power transfer to the load, rather than specifying the load power itself. For an AQ bus, the power flow formulation is only made up of a reactive power equation, thus reducing the size of the Jacobian matrix by one. This reduced Jacobian matrix is nonsingular at the
(Continued)

critical voltage point, eliminating a major difficulty in voltage stability analysis for power system operations.

10 Claims, 6 Drawing Sheets

(51) Int. Cl.
*G05B 19/048* (2006.01)
*H02J 4/00* (2006.01)
*H02J 13/00* (2006.01)
*H02J 3/00* (2006.01)

(52) U.S. Cl.
CPC ............... *G05B 2219/21155* (2013.01); *G05B 2219/21169* (2013.01); *H02J 13/0006* (2013.01); *H02J 2003/001* (2013.01); *H02J 2003/007* (2013.01); *Y02B 70/3225* (2013.01); *Y02E 60/76* (2013.01); *Y04S 20/222* (2013.01); *Y04S 40/22* (2013.01)

(58) Field of Classification Search
CPC ... Y04S 40/22; Y04S 20/222; Y02B 70/3225; G05F 1/66; G01R 19/2513; G01R 21/00; Y10S 706/915
See application file for complete search history.

(56) References Cited

U.S. PATENT DOCUMENTS

| | | |
|---|---|---|
| 5,745,368 A | 4/1998 | Ejebe et al. |
| 6,219,591 B1 | 4/2001 | Vu et al. |
| 6,249,719 B1 | 6/2001 | Vu et al. |
| 7,117,070 B2 | 10/2006 | Chow et al. |
| 7,177,727 B2 | 2/2007 | Chu et al. |
| 7,321,834 B2 | 1/2008 | Chu et al. |
| 7,813,884 B2 | 10/2010 | Chu et al. |
| 7,979,239 B2 | 7/2011 | Trias |
| 8,108,184 B2 * | 1/2012 | Fardanesh ............ G06F 17/504 703/18 |
| 8,126,667 B2 | 2/2012 | Zhang et al. |
| 8,326,594 B2 | 12/2012 | Sun |
| 9,099,866 B2 * | 8/2015 | Seaman ................... H02J 3/00 |
| 2012/0022713 A1 | 1/2012 | Deaver, Sr. et al. |
| 2013/0066480 A1 | 3/2013 | Glavic et al. |
| 2013/0204556 A1 | 8/2013 | Sun |
| 2013/0218494 A1 | 8/2013 | Chiang et al. |
| 2013/0238148 A1 | 9/2013 | Legbedji et al. |

FOREIGN PATENT DOCUMENTS

| | | |
|---|---|---|
| CN | 103199525 | 7/2013 |
| CN | 103353921 | 10/2013 |

* cited by examiner

METHODS OF COMPUTING STEADY-STATE VOLTAGE STABILITY MARGINS OF POWER SYSTEMS

CROSS-REFERENCE TO RELATED APPLICATIONS

This application claims priority in U.S. provisional patent applications 61/822,955 filed May 14, 2013 and 61/833,949 filed Jun. 12, 2013, which are both incorporated herein by reference.

STATEMENT OF GOVERNMENT INTEREST

This invention was made with government support under contract EEC1041877 awarded by the National Science Foundation and contract DE-AC02-05CH11231 awarded by the Department of Energy. The government has certain rights in the invention.

FIELD AND BACKGROUND OF THE INVENTION

The present invention relates in general to the field of regional electrical power supply systems, and in particular to a new and useful scalable, general-purpose, power flow calculation method and system that reduces or eliminates non-converging power system voltage stability calculation issues using a new bus type. The system outperforms the conventional calculation method where the power flow solution diverges due to ill-conditioning at high levels of power transfer. The new system's reformulated power flow configuration provides a new parameterization to eliminate the ill-conditioning issue in the power system's voltage stability calculation, improving its overall performance and operational cost.

Voltage instability has been the cause of many major blackouts, impacting industrial and commercial activities, incurring major inconvenience and costs for energy users, and resulting in increased utility operation and restoration cost.

Regional energy users are often found in a load center. A load center is generally defined as a particular geographical area where load demand is high and has few local power plants to satisfy the local power demand. Because there are few local power plants to satisfy the demand, the load center is usually supplied by multiple transmission sources through a number of boundary buses, resulting in a high proportional amount of load demand being provided by external power systems, i.e. power generation plants, and heavy power flow on the interface transmission lines. Load centers are therefore more susceptible to voltage instability and are typically voltage weak areas. Therefore, monitoring voltage stability at load centers is important and necessary. By monitoring the voltage stability condition at load centers and taking timely control actions, voltage instability can be effectively limited.

The prior does not contain the concept of an AQ-bus for voltage stability analysis that is a major feature of the present invention. Known works use the conventional PQ-bus type which results in numerical ill-conditioning near the point of maximum power transfer. To mitigate this issue, homotopy-based methods were introduced in the early 1990s and developed into commercial software (i.e., CPFLOW). However, these methods introduce complexity and additional computation. They mitigate but do not resolve the ill-conditioning problem.

Published patent application US 2013/0218494 discloses a Continuation Power Flow Method (or CPFLOW) for tracing power system behavior and is incorporated herein by reference.

A method for voltage stability analysis of power systems is disclosed in U.S. Pat. No. 5,745,368.

U.S. Pat. No. 7,979,239 discloses a system and method for monitoring and managing electrical power transmission and distribution networks.

A stability transfer limit calculation in a power transmission network is disclosed by U.S. Pat. No. 5,566,085.

A voltage stability discrimination system for power systems is disclosed by U.S. Pat. No. 4,974,140.

Applications and methods for voltage instability predictor (VIP) is disclosed by U.S. Pat. No. 6,249,719 and U.S. Pat. No. 6,219,591.

Real-time monitoring of electric power system voltage stability margins is disclosed by published patent application: US20130066480.

Measurement based voltage stability monitoring and control is disclosed by U.S. Pat. No. 8,126,667.

Bus-type extended load flow (BELF) is disclosed in the prior art and is known to the person of ordinary skill in the art of this invention.

U.S. Pat. No. 8,326,594 discloses a power flow analysis for balanced power distribution systems.

U.S. Pat. No. 7,321,834 discloses a method for calculating power flow solution of a power transmission network that includes an interline power flow controller (IPFC).

U.S. Pat. No. 7,813,884 discloses a method of calculating power flow solution of a power grid that includes generalized power flow controllers.

U.S. Pat. No. 7,117,070 discloses a power flow controller responsive to power circulation demand for optimizing power transfer.

U.S. Pat. No. 7,177,727 discloses a method for calculating power flow solution of a power transmission network that includes unified power flow controllers.

Published patent application US2013/0204556 discloses a hybrid three-phase power flow analysis method for ungrounded distribution systems.

Yang-2011 is an article that disclosed efficient solution algorithms for computing fold points of power flow equations.

Chinese patent CN102545206 discloses a voltage source commutation-high voltage direct current (VSC-HVDC) power flow computing method based on automatic differential (AD) and reserving non-linear method.

Chinese patent CN103091581 discloses a limit capacity transmission calculation method based on voltage collapse indices.

Chinese patent CN103199525 discloses a power distribution network flow computing method based on equivalent node injecting current transformation.

Chinese patent CN103353921 discloses a method for determining power system parallel load flow based on heuristic automatic network partitioning.

Nabavi-Niaki-1996 is an article that discloses a steady-state and dynamic models of unified power flow controller (UPFC) for power system studies.

Published patent application US2012/0022713 discloses a power flow simulation system, method and device.

Published patent application US20130238148 discloses an interior point method for a reformulated optimal power flow model.

A need remained for an effective, useful, scalable, general-purpose, power flow calculation method and system.

SUMMARY OF THE INVENTION

It is an object of the present invention to address voltage stability concerns that limits economic power transfer that has caused several major blackouts in the US and in other countries.

In real-time operation, voltage stability margin computation is hampered by the ill-conditioning of the power flow Jacobian matrix, a further object of the invention is to provide a method that changes the mindset to this problem.

The invention avoids the ill-conditioning issue in power flow by introducing a new AQ-type of bus which significantly reduces computational complexity and enables fast voltage stability analysis for large, complex systems. A key to the invention is the introduction of this new AQ-bus type for voltage stability analysis.

Another object of the invention is to extend the method to very large power systems.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
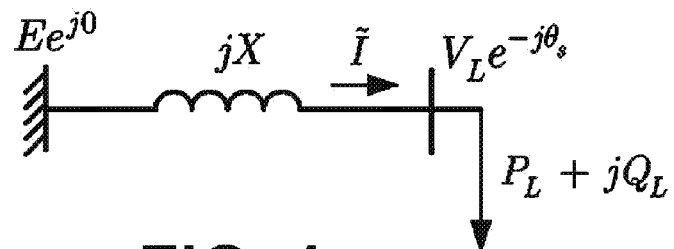
FIG. 1 is a schematic diagram of a stiff source (i.e. strong) two-bus power system where E is constant.

Voltage instability has been the cause of many major blackouts [8, 5, 12]. The numbers in brackets refer to the article references listed below. In a power system operation environment, it is important to ensure that the current operating condition is voltage stable subject to all credible contingencies. Methods for calculating the stability margin for each contingency can be classified into two categories: dynamic (time-domain simulation) and steady-state (power flow methods) [6, 7]. Time-domain simulation can capture the dynamic elements of voltage instability. The invention deals with steady-state voltage stability analysis occurring over a long time span.

One difficulty in steady-state voltage stability analysis is that the conventional Newton-Raphson power flow fails to converge as the maximum loadability point is reached. In the unconstrained case, the Jacobian matrix J becomes singular at maximum loading, and the power flow solution will not converge when the smallest singular value of J becomes too small [6, 7].

To circumvent this singularity problem, continuation power flow methods based on homotopy techniques have been developed [11, 4]. In this approach, a load-increase continuation parameter is introduced as an additional variable. As a result, the size of the Jacobian matrix is increased by one, which becomes non-singular with a suitable choice of the continuation parameter. The continuation power flow is solved in a two-step process with a predictor step and a corrector step, and requires additional manipulations and computation [1]. During the corrector step, the continuation method still needs to deal with a poorly conditioned Jacobian.

The subject invention uses a new power flow method to directly eliminate the singularity issue without adding the complexity required by such homotopy methods. Elimination of the singularity allows for a well-conditioned power flow solution even at the maximum loadability point. The central idea is to reformulate the power flow with the introduction of a new type of load bus, which we call an AQ bus (A standing for angle). A conventional power flow formulation uses three types of buses: PV buses, PQ buses, and the swing bus (Table 1). For an AQ bus, the bus voltage angle $\theta$ and the reactive power consumption Q are specified. In this sense, a swing bus can be considered as an AV bus, because its angle is fixed and its voltage magnitude is known. In this formulation, the active power balance equation at the AQ load bus is no longer needed. Only the reactive power balance equation is kept. Furthermore, because $\theta$ at this bus is known, it is eliminated from the power flow solution vector consisting of bus voltage magnitudes of PQ buses and bus voltage angles of all the buses except for the swing bus. Thus the size of the resulting Jacobian matrix $J_R$ is reduced by one. This matrix is nonsingular at the maximum loadability point, and thus it avoids the singularity problem of the conventional Jacobian matrix J.

The method of the invention provides means, such as a computer for running algorithms of the method, voltage angle and other meters to inputting values to be used by the algorithms, and any other suitable equipment for measuring other parameters and for issuing control or information signals used by the invention.

TABLE 1

| Power flow bus types | | |
| --- | --- | --- |
| Bus types | Bus representation | Fixed values |
| PV | Generator buses | Active power generation and bus voltage magnitude |
| PQ | Load buses | Active and reactive consumption |

TABLE 1-continued

Power flow bus types

| Bus types | Bus representation | Fixed values |
|---|---|---|
| AV | Swing bus | Voltage magnitude and angle |
| AQ | Load buses | Voltage angle and reactive power consumption |

The load increase on Bus $B_L$, when specified as an AQ bus in this new power flow method, is achieved by increasing the bus voltage angle separation $\theta_s$ between Bus $B_L$ and the swing bus. It is expected that the load $P_L$ will increase with $\theta_s$ until the critical voltage point, then further increases in $\theta_s$ will result in a decrease of $P_L$. For each value of $\theta_s$, the amount of $P_L$ is not known until the power flow is solved. This eliminates the active power balance equation at the load bus $B_L$. The reactive power balance equation at $B_L$ is still maintained. For load increases involving constant-power-factor loads and at multiple buses, additional expressions are needed to develop the reduced Jacobian matrix $J_R$. The computation of voltage stability margins using this method is no more complicated than a conventional load flow solution and the step size in increasing $\theta$ to reach the critical voltage point is not limited. In addition, computation-speed enhancement techniques such as decoupled power flow can still be used [3].

This disclosure is organized as follows. In Section II, we use a single-load stiff-bus model to motivate the new problem formulation. Section III provides the general framework of the approach. Section IV uses two example test systems to illustrate the method. In Section V we discuss other applications, and we conclude in Section VI.

II Motivation

Consider the two-bus power system shown in FIG. 1, in which the load bus is connected via a reactance X to the stiff voltage source with E=pu and its angle set to zero. The load is denoted by a voltage of magnitude $V_L$ and phase $-\theta_s$, and a power consumption $P_L+jQ_L$. The angle $\theta_s$ is positive so that power is transferred from the stiff source to the load. Following [6], we will consider the power flow solutions of the system for constant power load where $Q_L=P_L \tan(\phi)$, where $\cos(\phi)$ is the power factor ($\phi$ is positive for lagging and negative for leading).

There are two relevant power flow equations for this system, both for the load bus:

$$P_L = -\frac{V_L E \sin\theta_s}{X}, \quad (1)$$

$$Q_L = \frac{V_L E \cos\theta_s}{X} - \frac{V_L^2}{X}.$$

Treating the load bus as a PQ bus, the Jacobian matrix obtained by taking the partial derivatives of these two equations with respect to $\theta_s$ and $V_L$ is $$J = -\frac{1}{X}\begin{bmatrix} V_L E \cos\theta_s & E\sin\theta_s \\ V_L E \sin\theta_s & 2V_L - E\cos\theta_s \end{bmatrix} \quad (2)$$

The Jacobian J is singular when $$\det J = (2V_L \cos\theta_s - E)/X = 0 \quad (3)$$

which occurs at the critical voltage point.

If the load bus is taken as an AQ bus, then the separation angle $\theta_s$ can be specified without specifying $P_L$ and the active power equation is no longer needed. If $Q_L$ is fixed, then the reduced matrix $J_R$ is simply the (2,2) entry of J (2). Here the load is of constant power factor, i.e., $Q_L=P_L \tan(\phi)$, allowing the reactive power equation to be rewritten as $$Q_L = \frac{V_L E \cos\theta_s}{X} - \frac{V_L^2}{X} = -\frac{V_L E \sin\theta_s}{X}\tan\phi \quad (4)$$

that is, $$0 = \frac{V_L E \cos\theta_s}{X} - \frac{V_L^2}{X} + \frac{V_L E \sin\theta_s}{X}\tan\phi. \quad (5)$$

The reduced Jacobian is the partial derivative of (5) with respect to $V_L$ $$J_R = \frac{1}{X}(E\cos\theta_s - 2V_L + E\sin\theta_s\tan\phi) \quad (6)$$

which is singular when $J_R=0$.

Figure 2:
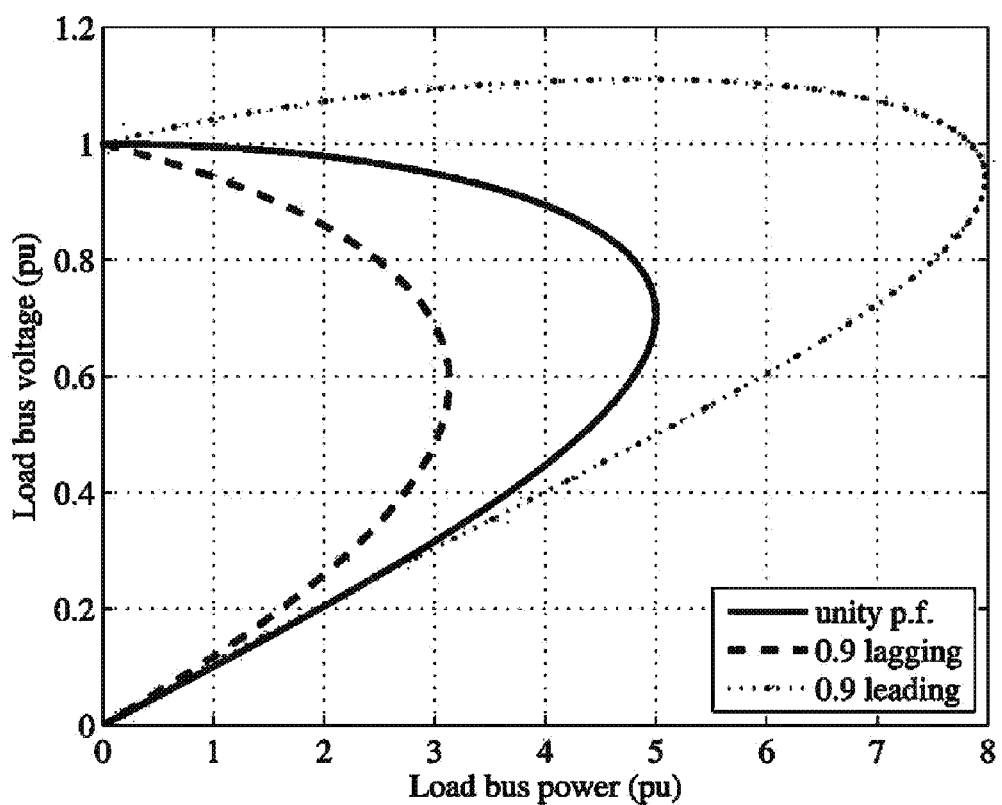
FIG. 2 are PV (Power-Voltage) curve plotting load bus voltage against load bus power in pu (power units) with the solid line showing unity p.f., the dash-dash line showing 0.9 lagging and the dash-dot-dot line showing 0.9 leading results.

For the 2-bus system in FIG. 1, we explore the singularities of the Jacobians (2) and (6). Using E=pu and X=pu, we plot the variation of $\theta_s$, $P_L$, $V_L$, and the determinants of J and $J_R$, for 0.9 lagging, unity, and 0.9 leading power factor loads. FIG. 2 shows the familiar PV curve. The singularity of J occurs when the slope of the PV curve becomes infinite.

Figure 3:
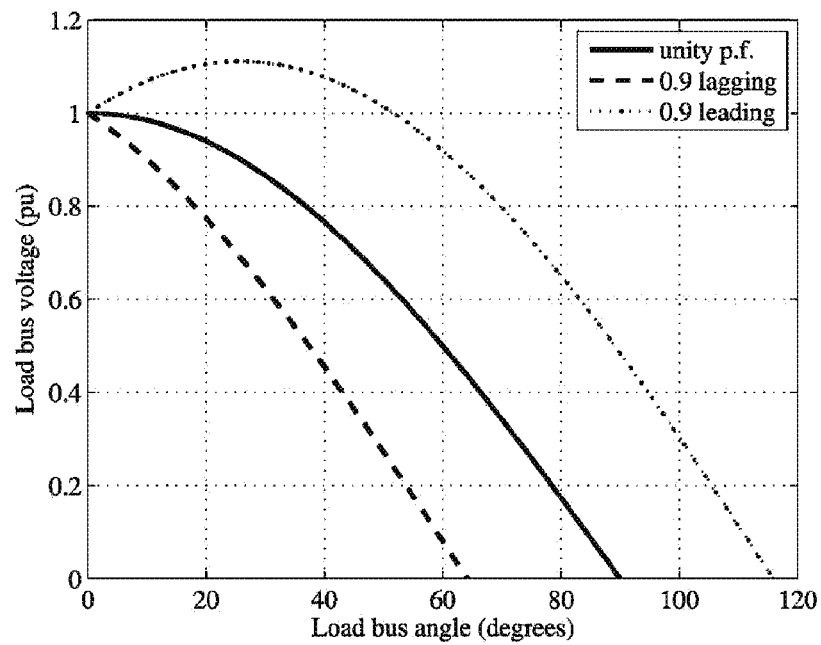
FIG. 3 is a graph show variation of $V_L$ versus $\theta_s$.
Figure 4:
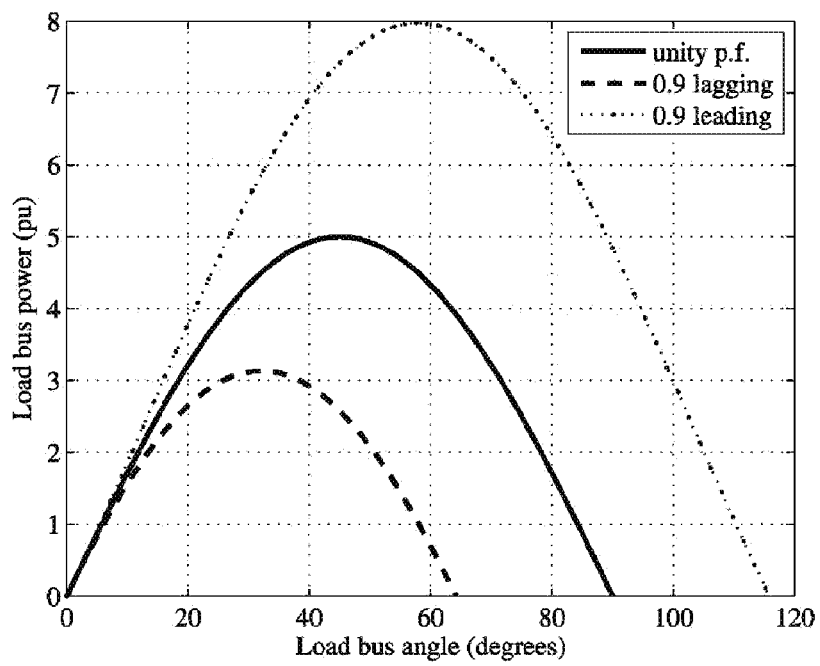
FIG. 4 is a graph show variation of $P_L$ versus $\theta_s$.

FIGS. 3 and 4 show the variation of $V_L$ and $P_L$ versus $\theta_s$. The slopes of these curves are finite within the complete operational range of the angle separation. The peak of each $P_L$ curve in FIG. 4 corresponds to the value of the separation angle $\theta_s$ at the critical voltage point. Note that the power factor of the load determines the maximum $\theta_s$ that is feasible.

Figure 5:
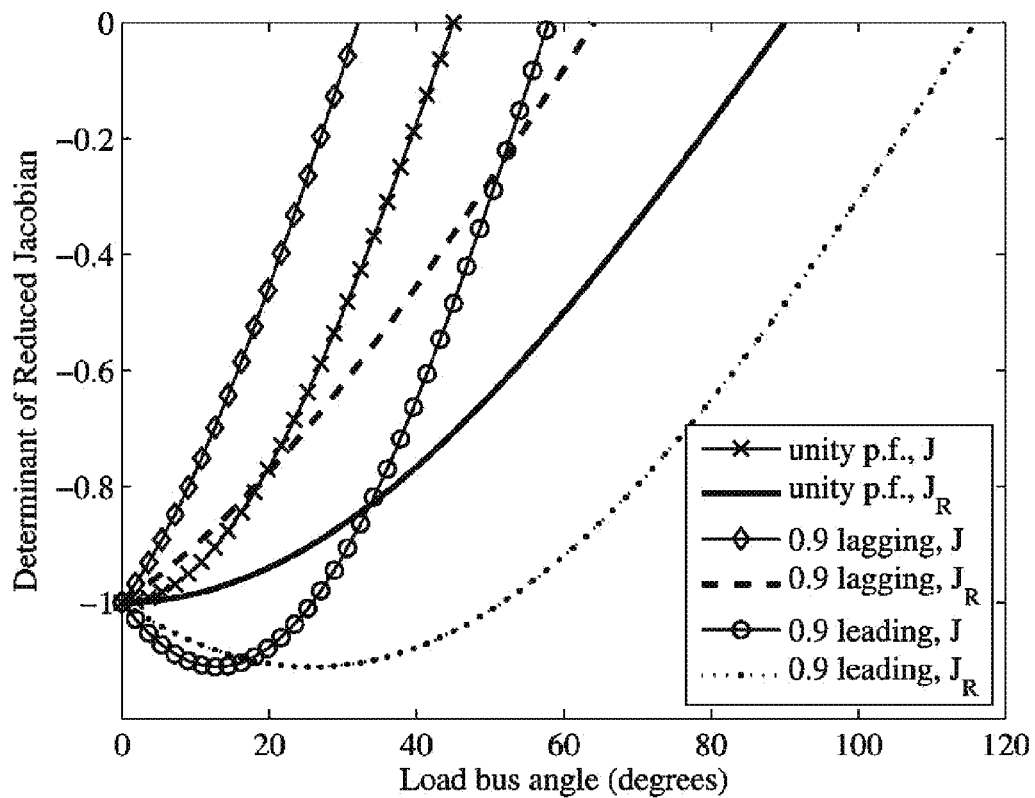
FIG. 5 is a graph plotting values of determinants J and $J_R$ as a function of $\theta_s$.

The values of the determinants of J and $J_R$ are shown in FIG. 5. It is seen that det (J)=0 at $\theta_c$, the value of the angle separation at the critical voltage point. On the other hand, $J_R$ remains nonzero at $\theta_c$, such that the Newton-Raphson iteration scheme will readily converge. In addition, $J_R=0$ only when the load bus voltage $V_L$ is zero.

FIGS. 4 and 5 show that the separation angle $\theta_s$ is a useful variable to provide additional insights into the voltage stability problem. Most voltage stability analysis investigations have focused directly on $V_L$ and largely ignored following up on $\theta_s$.

III Theoretical Framework and Computation Algorithms

In this section, we consider the general framework of a power flow formulation including an AQ bus, and extend the method for steady-state voltage stability analysis allowing for load and generation increases on multiple buses and for constant power factor loads.

Consider a power system with $N_G$ generator buses and $N_L$ load buses, such that the total number of buses is $N=N_G+N_L$. Let Bus 1 be the swing bus, Buses 2 to $N_G$ be the generator PV buses, and Buses $N_G+1$ to N be the load PQ buses.

The power flow problem consists of solving the active and reactive power injection balance equations $$\Delta P_i = P_i - f_{Pi}(\theta, V) = 0, \; i=2, \ldots, N \quad (7)$$

$$\Delta Q_i = Q_i - f_{Qi}(\theta, V) = 0, \; i=N_G+1, \ldots, N \quad (8)$$

where $P_i$ and $Q_i$ are the scheduled active and reactive power injections at Bus i. Vectors V and θ contain the bus voltage magnitudes and angles, and and are the computed active and reactive power injections, respectively. ΔP is the vector of active power mismatches at Buses 2 to N, and ΔQ is the vector of reactive power mismatches at Buses $N_G+1$ to N.

The power flow problem is commonly solved by the Newton-Raphson method, using the iteration $$J \begin{bmatrix} \Delta \theta \\ \Delta V \end{bmatrix} = \begin{bmatrix} J_{11} & J_{12} \\ J_{21} & J_{22} \end{bmatrix} \begin{bmatrix} \Delta \theta \\ \Delta V \end{bmatrix} = \begin{bmatrix} \Delta P \\ \Delta Q \end{bmatrix} \quad (9)$$

where the Jacobian matrix J is a square matrix of dimension $(2N-N_G-1)$ containing the partial derivatives of the active and reactive power flow equations with respect to the bus angles θ and the voltage magnitudes V, where $$J_{11} = \frac{\partial f_P}{\partial \theta}, J_{12} = \frac{\partial f_P}{\partial V}, J_{21} = \frac{\partial f_Q}{\partial \theta}, J_{22} = \frac{\partial f_Q}{\partial V} \quad (10)$$

$$\theta = [\theta_2 \ldots \theta_N]^T \quad (11)$$

$$V = [V_{N_G+1} \ldots V_N]^T \quad (12)$$

Δθ and ΔV are the corrections θ and V, respectively.

A. Power Flow Formulation Including an AQ Bus

Suppose Bus N is an AQ bus with $\theta_N = \theta^°_N$ and $Q_N$ specified, then the Newton-Raphson iteration reduces to $$J_R \begin{bmatrix} \Delta \theta_R \\ \Delta V \end{bmatrix} = \begin{bmatrix} J_{R11} & J_{R12} \\ J_{R21} & J_{R22} \end{bmatrix} \begin{bmatrix} \Delta \theta_R \\ \Delta V \end{bmatrix} = \begin{bmatrix} \Delta P_R \\ \Delta Q \end{bmatrix} \quad (13)$$

where $$J_{R11} = J_{11}(1 \ldots N-2; 1 \ldots N-2)|_{\theta_N=\theta^°_N} \quad (14)$$

$$J_{R12} = J_{12}(1 \ldots N-2; 1 \ldots N-N_G)|_{\theta_N=\theta^°_N} \quad (15)$$

$$J_{R21} = J_{21}(1 \ldots N-N_G; 1 \ldots N-2)|_{\theta_N=\theta^°_N} \quad (16)$$

$$J_{R22} = J_{22}|_{\theta_N=\theta^°_N}. \quad (17)$$

The number of bus angle variables is reduced by one, such that $$\Delta \theta_R = [\Delta \theta_2 \ldots \Delta \theta_{N-1}]^T. \quad (18)$$

The AQ bus active power flow equation is eliminated, such that $\Delta P_R$ is the vector of active power mismatches at Buses 2 to (N−1). The load $P_N$ on Bus N is no longer specified, but it can be computed using $f_{Pi}(\theta, V)$.

This reduced power flow formulation would not yield directly a specific $P_N$ on Bus N. However, this is not a hindrance in voltage stability analysis. Instead of increasing $P_N$ on Bus N and not knowing whether the non-convergent result is actually the maximum loadability point, a user can keep increasing the angular separation between Bus N and the swing bus until the maximum power transfer point is reached. The reduced Jacobian $J_R$ would not be singular at that point and the maximum loadability point can be readily computed.

B. Voltage Stability Analysis for Constant-Power-Factor Loads

In voltage stability analysis, it is common to specify constant-power-factor loads. In this section, we will extend the iteration (13) to a more general case by considering constant-power-factor load increases at multiple load buses to be supplied by generators at multiple locations.

Let Buses $N_P$ to N be load buses with constant power factor cos φ, that is, $Q_I = P_I \tan \phi_I$ for $I=N_P, \ldots, N$. The active power load increases at these load buses are scaled with respect to Bus N, that is, $$P_I - P_I^0 = \alpha_I(P_N - P_N^0), l=N_P, \ldots, N-1. \quad (19)$$

The load increase is balanced by increases in outputs of generators on Buses 1 to q, with the active power at these generators scaled according to the swing bus $$P_k - P_k^0 = \beta_k(P_1 - P_1^0), k=2, \ldots, q. \quad (20)$$

In a solved power flow solution, the active power injections at Buses 1 and N are computed as the power flow leaving the buses on the lines interconnecting them to the other buses. Thus in an AQ-bus formulation, we account for the groups of increasing load and generation by modifying the power flow injection equations such that $$f_{Pk}(V,\theta) = \beta_k f_{P1}(V,\theta), k=2, \ldots, q \quad (21)$$

$$f_{Pl}(V,\theta) = \alpha_l f_{PN}(V,\theta), l=N_P, \ldots, N-1 \quad (22)$$

$$f_{Ql}(V,\theta) = \alpha_l f_{PN}(V,\theta) \tan \phi_l, l=N_P, \ldots, N-1. \quad (23)$$

The other injection equations remain unchanged.

In obtaining a new reduced Jacobian matrix to solve this new power flow problem, we need two row vectors of partial derivatives of $f_{P1}$ and $f_{PN}$ $$J_i = \begin{bmatrix} \frac{\partial f_{Pi}}{\partial \theta_R} & \frac{\partial f_{Pi}}{\partial V} \end{bmatrix}, \quad (24)$$

$$i = 1, N$$

where $J_i$ is the ith row of the Jacobian. Note that $J_N$ is row N−1 of J without the entry due to $\Delta \theta_N$, and $J_1$ is not contained in J because Bus 1 is the swing bus.

Thus the reduced Jacobian $J_R$ in (13) for the fixed reactive power injection problem is modified to form a new reduced Jacobian vector $\bar{J}_R$, such that $$\bar{J}_{Ri} = J_{Ri} - \beta_k J_1, i=1, \ldots, q-1, k=2, \ldots q \quad (25)$$

$$\bar{J}_{Ri} = J_{Ri} - \alpha_l J_N, i=N_p-1, \ldots, N-2, l=N_P \ldots N-1 \quad (26)$$

$$\bar{J}_{Ri} = J_{Ri} - \alpha_l J_N \tan \phi_l, i=N_{J_R}-N_p, \ldots, N_{J_R}, l=N_p, \ldots, N-1 \quad (27)$$

where $N_{JR} = 2N-N_G-2$ is the dimension of $J_R$. The other rows of $J_R$ remain unchanged.

In this more general formulation of the AQ-bus power flow, the Newton-Raphson iteration becomes $$\bar{J}_R \begin{bmatrix} \Delta \theta_R \\ \Delta V \end{bmatrix} = \begin{bmatrix} \Delta P_R \\ \Delta Q \end{bmatrix} \quad (28)$$

where the power mismatch (21)-(23) is based on the previous iteration. In voltage stability margin calculations, the injection solution at a lower angle separation condition can be used to initiate the solution process.

C. Algorithms for Computing Voltage Stability Margins

Because vector $J_R$ in (28) would not be singular at the maximum loadability point, fast and well-conditioned voltage stability margin calculation methods can be formulated.

Here we present two algorithms for steady-state voltage stability analysis as basic applications of the AQ-bus method.

Algorithm 1: Using AQ-Bus Power Flow with Vector $J_R$ to Compute Voltage Stability Margins 1. From the current operating point (base case) with a power transfer of $P_0$, specify the load and generation increment schedule, and the load composition (such as constant power factors).
2. Use a conventional power flow program with increasing loads until the Newton-Raphson algorithm no longer converges.
3. Starting from the last converged solution in Step 2, apply the AQ-bus power flow method (19)-(28) to continue the power flow solution by increasing the angle separation $(\theta_1-\theta_N)$ between the AQ bus and the swing bus until the maximum power transfer $P_{0max}$ is reached. Typically, the bus with the largest load increase will be selected to be the AQ bus. The base-case voltage stability margin is $P_{0m}=P_{0max}-P_0$.
4. Specify a set of $N_c$ contingencies to be analyzed.
5. For contingency i, repeat Steps 2 and 3 for the post-contingency system to compute the maximum power transfer $P_{0max}$ and the voltage stability margin $P_{im}=P_{imax}-P_0$.
6. Repeat Step 5 for all contingencies i=1, 2, . . . , $N_C$.
7. The contingency-based voltage stability margin, measured as additional power delivered to the load until the maximum loadability point, is given by $$P_m = \min_{i=0,\ldots,N_c} \{P_{imax}\}. \quad (29)$$

Note that for any of the contingencies in Step 5, if the AQ-bus algorithm for $P_0$ fails to converge, that is, $P_0$ is not a feasible solution, then the AQ-bus algorithm can be used to reduce $P_0$ until a converged power flow solution is obtained. The new power flow solution would then be a voltage secure operating condition.

Also note in Steps 3 and 5 of Algorithm 1, all the capability of the conventional power flow can be used. For example, taps can be adjusted to maintain voltages, and generators exceeding their reactive power capability can be changed to PQ buses from PV buses. Both capabilities are important for finding the proper voltage stability limit.

The advantage of using a conventional power flow algorithm in Step 2 of Algorithm 1 is that it will allow a user to select the AQ bus for Step 3. There are several ways to select the AQ bus: (1) use the bus with the largest load increase (as stated in Step 3 of Algorithm 1), (2) use the bus with the largest rate of decrease of the bus voltage magnitude, or (3) use the bus angle with the largest component in the singular vector of the smallest singular value of J from the last converged solution. Frequently all three will yield the same bus.

It is also possible to solve for voltage stability margins without updating $J_R$ (13). This method can be useful when one wants to avoid changing or reprogramming the Jacobian matrix entries, but it has slower convergence. The load increase condition (19), the generator increase condition (20), and the load power factor condition $Q_I=P_I \tan \phi_I$ are now enforced as fixed values after each power flow iteration has converged.

To be more specific, start from the nominal power flow solution with the load on Bus N at $P_0$. The angular separation of Bus N and the swing bus is increased without changing any injections. The power flow is solved, and the resulting load at Bus N and the generation at the swing bus are computed. This new value $P_N$ is used to compute the load increase on the other load buses (19), to be balanced by the generations according to (20). These new load and generation values are used to solve for another AQ-bus power flow. The process is repeated until the load and generation proportions are within tolerance. This procedure is summarized is the following algorithm.

Algorithm 2: Using Unmodified $J_R$ to Compute Voltage Stability Margins

1. From the current operating point (base case) with a power transfer of $P_0$, determine the load and generation increment schedule, and the load composition (such as constant power factor).
2. Use a conventional power flow program with increasing loads until the Newton-Raphson algorithm no longer converges.
3. Starting from the last converged solution in Step 2, apply the AQ-bus power flow algorithm (13) by increasing the angle separation between the AQ bus and the swing bus, to obtain a converged value of load at Bus N as $P_N$.
4. Update the loads and generations at the other buses according to (19) and (20), respectively, and repeat the power flow solution, until (19) and (20) are satisfied.
5. Increase the angular separation between Bus and the swing bus and repeat Steps 3 and 4 until the load power at Bus N reaches the maximum value.
6. Apply Steps 4 to 7 of Algorithm 1 using Steps 2 to 5 of this algorithm to find the contingency-based voltage stability margin.

It is expected that Algorithm 2 would be slower than Algorithm 1. However, in Algorithm 2, minimal additional code for the Jacobian is needed.

IV Illustrative Examples

In this section the AQ-bus power flow approach is applied to solve for the voltage stability margin of a 2-area, 4-machine system, and a 48-machine system.

A. Two-area System

Figure 6:
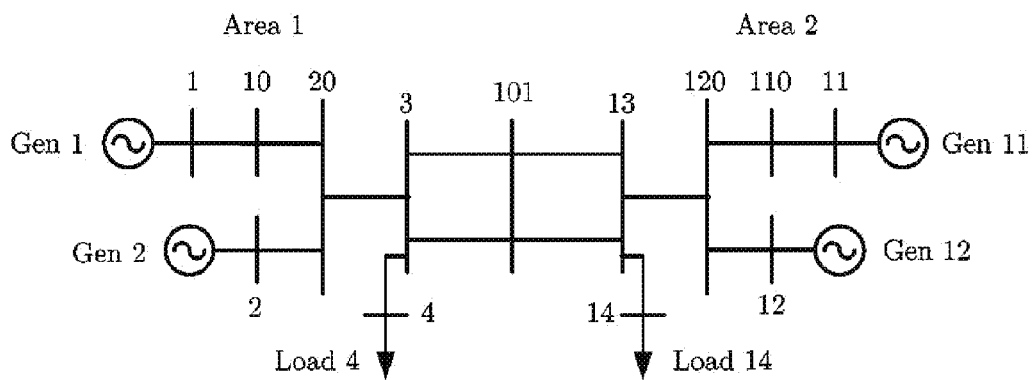
FIG. 6 is a schematic diagram of a Klein-Rogers-Kundur, 2-area, 4-machine system.

We first use the Klein-Rogers-Kundur 2-area, 4-machine system [2] shown in FIG. 6 to illustrate the method. In this system, Load 14 will be increased at a constant power factor of 0.9 lagging whereas Load 4 is kept constant at 9.76+j1 p.u. The load increase is supplied by Generator 1. It is assumed that all the generators have unlimited reactive power supply.

Figure 7:
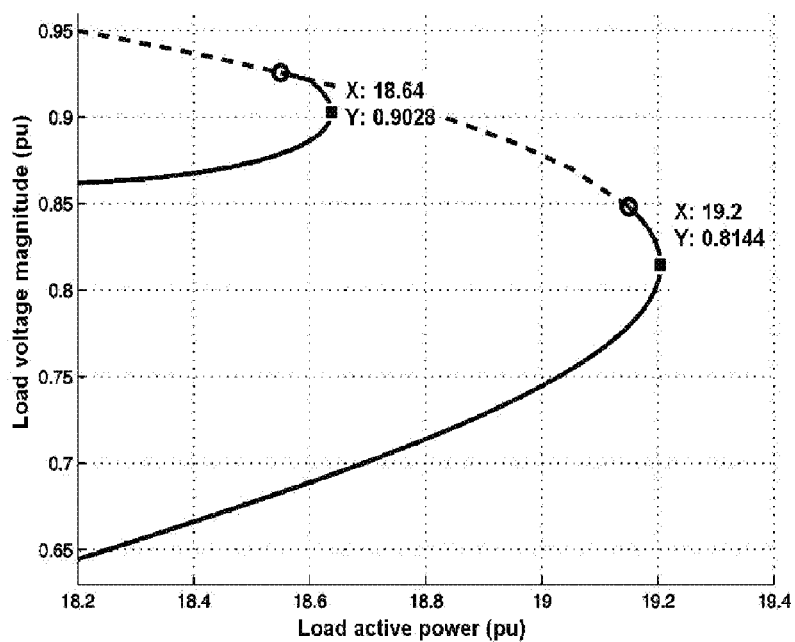
FIG. 7 are Power-voltage (PV) curves of a two-area system computed using Algorithm 1, the dash-dash line of the smaller curve showing conventional power flow to a switch to AQ-bus approach illustrated by a circle, followed by a solid line showing AQ-bus approach and the dash-dash line of the larger curve showing conventional power flow (var-limited) to a switch to AQ-bus approach illustrated by a circle, followed by a solid line showing AQ-bus approach (var-limited)

Using Algorithm 1, the conventional power flow solution is shown as the dash-dash line of the larger PV curve in FIG. 7. It fails to converge when the active power of Load 14 is $P_{14}=19.15$ pu which occurs when the angle separation is $\theta_1-\theta_{14}=91.1$ degrees. After this point, symbolized by the circle, the AQ-bus approach is used to continue the power flow solution by further increasing the angle separation between Buses 1 and 14. The solution of the AQ-bus approach is shown as the solid line of the PV curve in FIG. 7. From the PV curve, the critical voltage is 0.8144 p.u. and the maximum active load power is 19.2 p.u., with a power factor of 0.9 lagging.

Figure 8:
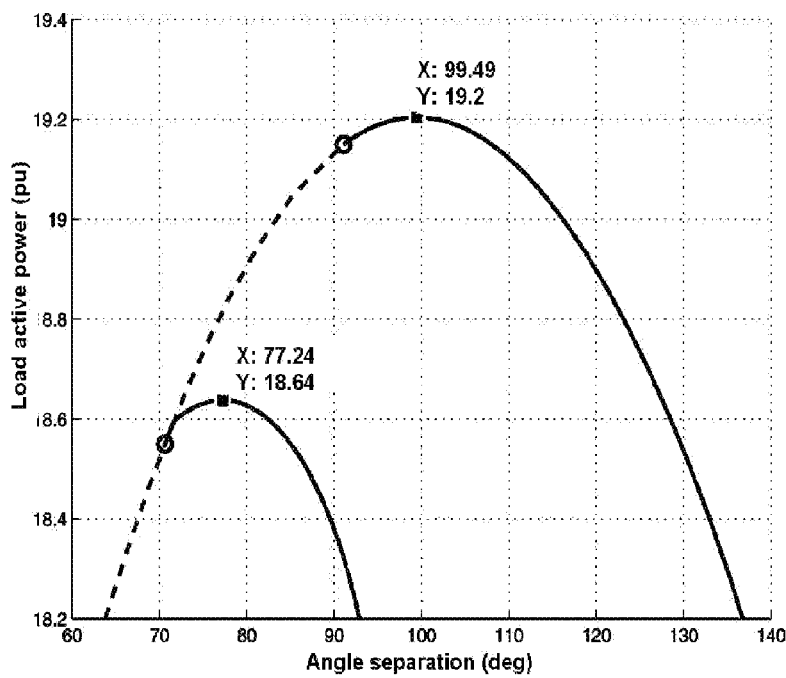
FIG. 8 are Power-angle ($P_\theta$) curves of a two-area system computed using Algorithm 1, with the same line symbols as in FIG. 7.

We also plot the load active power at Bus 14 versus the angle separation $\theta_1-\theta_{14}$ with the black curves in FIG. 8. Note that at maximum power transfer, $\theta_1-\theta_{14}=99.5$ degrees.

1) Singular Value Analysis

At the maximum loadability point, the largest singular value of J is 423 and the two smallest singular values are 3.59 and 0.02. At the same operating point, the largest and smallest singular values of the vector $J_R$ matrix are 423 and 2.49, respectively. Thus vector $J_R$ does not exhibit any singularity or convergence problems.

At the point where the conventional power flow fails to converge, the smallest singular value of the Jacobian is 0.05 and its singular vector is given in Table 2. Note that the element of the singular vector with the largest magnitude corresponds to $\theta_{14}$, the bus angle of the chosen AQ bus.

TABLE 2

Singular vector corresponding to the smallest singular value of the conventional power flow Jacobian

| Singular vector component | Corresponding variable |
|---|---|
| 0.025 | $\theta_2$ |
| 0.064 | $\theta_3$ |
| 0.075 | $\theta_4$ |
| 0.005 | $\theta_{10}$ |
| 0.329 | $\theta_{11}$ |
| 0.358 | $\theta_{12}$ |
| 0.416 | $\theta_{13}$ |
| 0.450 | $\theta_{14}$ |
| 0.031 | $\theta_{20}$ |
| 0.228 | $\theta_{101}$ |
| 0.332 | $\theta_{110}$ |
| 0.366 | $\theta_{120}$ |
| 0.085 | $V_3$ |
| 0.086 | $V_4$ |
| 0.021 | $V_{10}$ |
| 0.117 | $V_{13}$ |
| 0.125 | $V_{14}$ |
| 0.048 | $V_{20}$ |
| 0.172 | $V_{101}$ |
| 0.024 | $V_{110}$ |
| 0.062 | $V_{120}$ |

2) Including Var Limits on a Generator

Because the AQ-bus power flow incorporates all the functionalities of a conventional power flow, we can readily demonstrate the effect of a var limit on a generator. Suppose we impose a maximum reactive power generation of 3 pu for Generator 2, that is, if the reactive power generation of Generator 2 exceeds 3 pu, it will be changed into a PQ bus with Q=3 pu. The resulting PV and Pθ curves for the same load increase conditions are shown as the smaller solid line curves in FIGS. 7 and 8.

Figure 9:
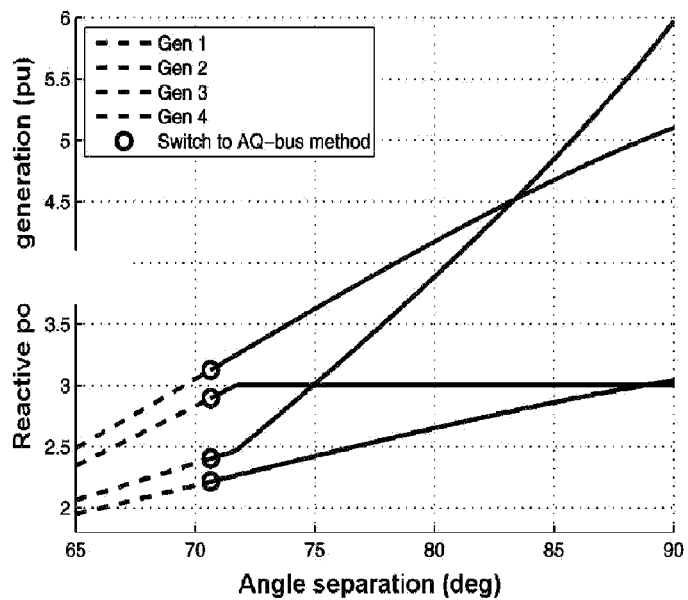
FIG. 9 is a graph of reactive power output of generators in a two-area system with a var limit.

Also of interest is the amount of reactive power provided by the four generators. FIG. 9 shows the reactive power plotted versus $\theta_1-\theta_{14}$ for the var-limited case. We observe that the var limit on Generator 2 increases the reactive power burden on Generator 1, and the reactive power losses continue to increase after the point of maximum power transfer point, even though the active power consumed by the load decreases.

3) Solution Using Algorithm 2

We applied Algorithm 2 to the two-area system and obtained the same results as with Algorithm 1. Note that with Algorithm 2, $J_R$ is not modified to include the load and generator increase schedules. Thus Algorithm 2 is similar to a dishonest Newton method and needs more iterations than Algorithm 1.

B. NPCC 48-Machine System

Figure 10:
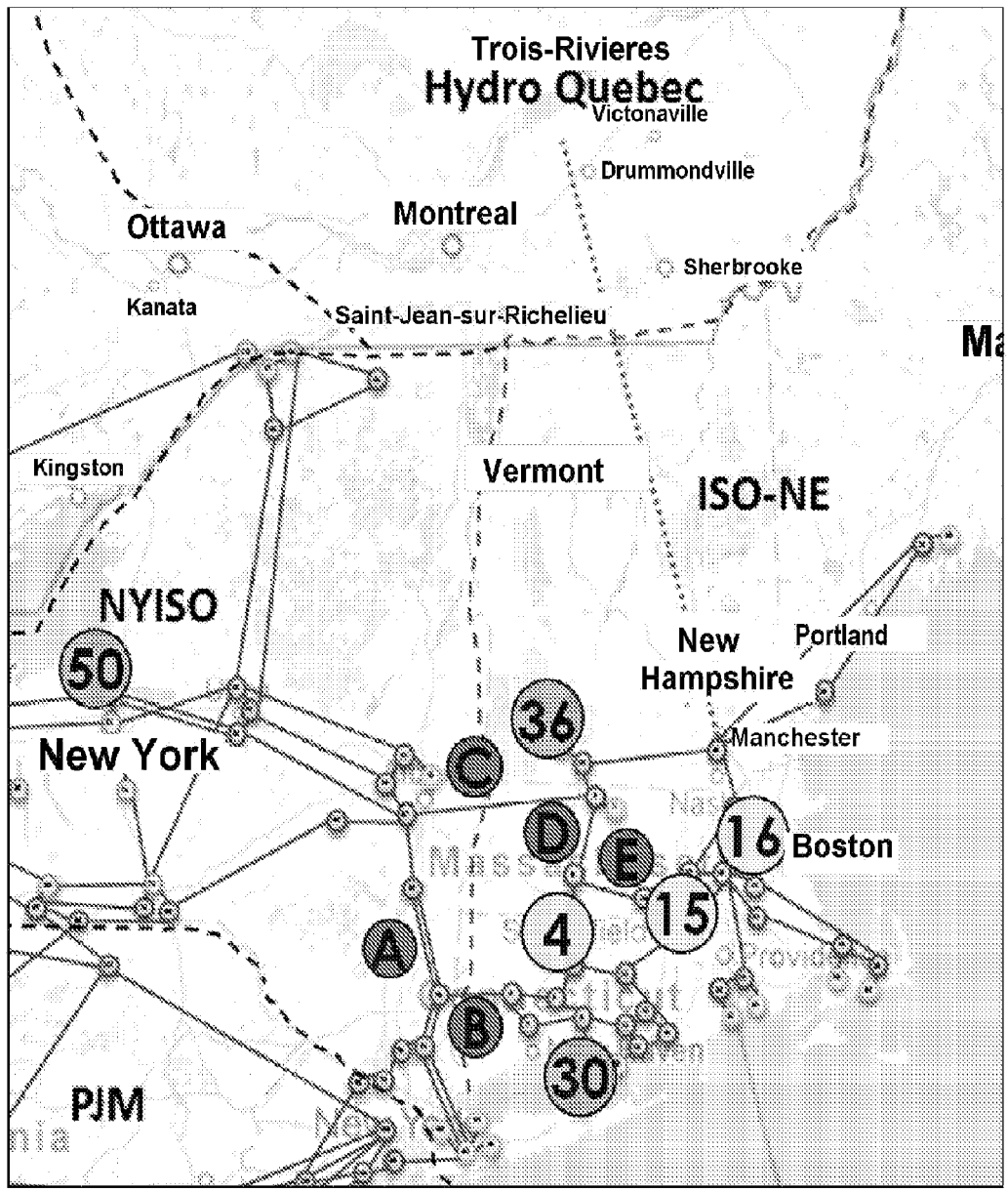
FIG. 10 is a map of an NPCC 48-machine system.

In this section we extend the AQ-bus power flow to a 48-machine NPCC (Northeast Power Coordinating Council) system [9] using Algorithm 1. A portion of the system map is given in FIG. 10. For this system, we increase the loads on Buses 4, 15, and 16 near Boston, with increased supply coming from the generators on Buses 30 and 36 in New England, and the generator on Bus 50 in New York, as indicated in FIG. 10. We choose Bus 50 as the swing bus and Bus 16 as the AQ bus. Generators on Buses 30 and 36 supply additional power as linear functions of the swing bus power output, as shown in Table 3. Similarly, the loads on Buses 4 and 15 are scaled with respect to the AQ bus, as shown in Table 4. Any of the buses in the load increase group (Buses 4, 15, and 16) can chosen as the AQ bus for our method to work. The loads at Buses 4, 15, and 16 all have a constant power factor of 0.95 lagging. All the other loads remain constant at their base values, and the active power generation for the other generators also remain constant.

TABLE 3

Generator schedule for 48-machine system

| Generator Bus # | Bus Type | $\beta_k$ |
|---|---|---|
| 50 | AV (swing) | — |
| 30 | PV | 0.10 |
| 36 | PV | 0.80 |

TABLE 4

Load schedule for 48-machine system

| Load Bus # | Bus Type | $\alpha_l$ |
|---|---|---|
| 16 | AQ | — |
| 4 | PQ | 0.50 |
| 15 | PQ | 0.25 |

Figure 11:
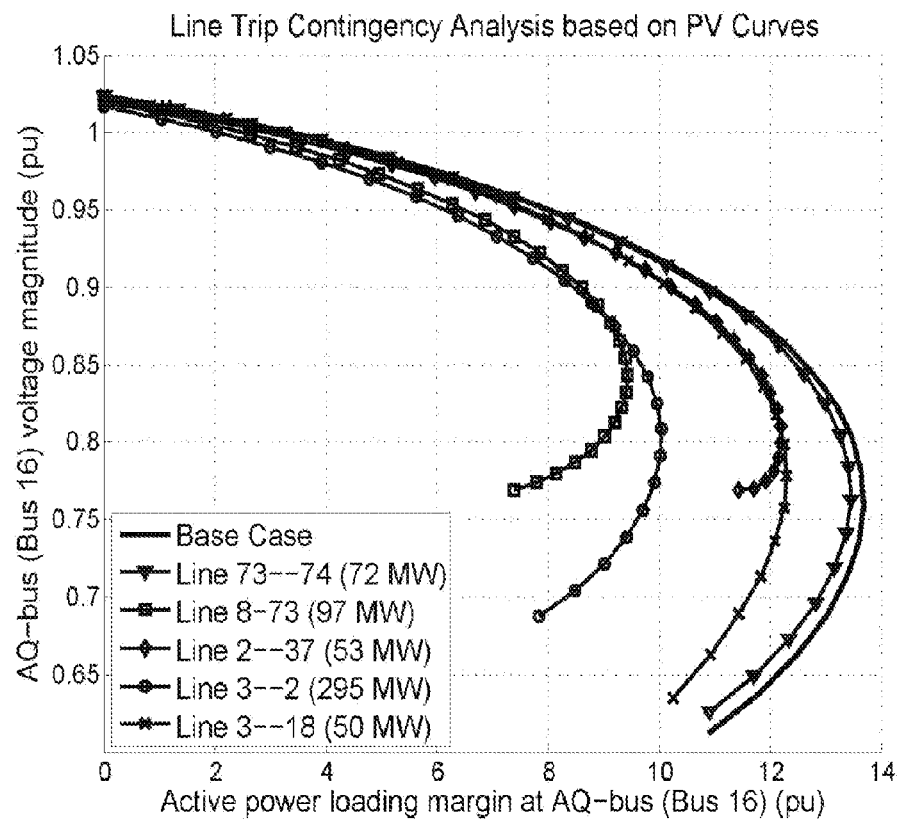
FIG. 11 are PV-curves for multiple contingencies on the NPCC 48-machine system.

We use the AQ-bus method to compute the PV curve for the base case, which is shown in FIG. 11 as the base case. The method readily computes the PV curve to the maximum loadability point and beyond. The algorithm fails to converge when the system voltage is too low, because some load buses can no longer receive enough reactive power.

To demonstrate the computation of the voltage stability margin for contingency analysis, a set of line outage contingencies (A-E) is selected, as listed in Table 5. The location of these lines are labeled in FIG. 10. In FIG. 11, we plot the computed PV curves for the five contingencies against the base case PV curve. Note that each power flow solution is designated with a plot marker in FIG. 11, demonstrating that the AQ-bus method does not require a small step size near the maximum power transfer point. In this example we used a step size of 5 degrees but larger angle steps can be used.

Note that Line 73-74 is in New York. Hence its outage results in a PV curve not much different from the base case PV curve. Lines 3-2 and 3-18 are near the buses with load increases, and thus the PV curves resulting from their outage show less stability margins. Lines 8-73 and 2-37 are interface lines between New York and New England. Their outages have significant impact on the voltage stability margin because part of the load increase in New England is supplied by a New York generator. From Table 5, the contingency-based voltage stability margin is 944 MW for the load on Bus 16.

TABLE 5

Contingency list for 48-machine system

| Contingency | Line Outage | Pre-contingency Power Flow | Voltage Stability Margin |
|---|---|---|---|
| A | 73-74 | 72 MW | 1,346 MW |
| B | 8-73 | 97 MW | 944 MW |

TABLE 5-continued

Contingency list for 48-machine system

| Contingency | Line Outage | Pre-contingency Power Flow | Voltage Stability Margin |
|---|---|---|---|
| C | 2-37 | 53 MW | 1,221 MW |
| D | 3-2 | 295 MW | 1,005 MW |
| E | 3-18 | 50 MW | 1,231 MW |

V Other Applications

The novel AQ-bus power flow method can be used in a practical application as a method of identifying and correcting potential voltage instability caused by a contingency in an electrical power generation and distribution system, the electrical power generation and distribution system comprising a plurality of buses, the plurality of buses comprising at least one generator bus and at least one load bus, each bus having a maximum loadability. In such an application, the method may comprise the steps of:

modeling a power flow problem by specifying one of the plurality of buses as an AQ bus, specifying another of the plurality of buses as a swing bus, and specifying an angular separation between the AQ bus and the swing bus;

solving the power flow problem to yield a power transfer from generation to load;

repeating the solving step using a new increased angular separation in every repetition of the solving step until a maximum power transfer from generation to load is determined;

calculating a voltage stability margin by calculating the difference between the maximum power transfer and the power transfer at the current operating condition;

determining whether corrective action is required by comparing the voltage stability margin to a safety margin;

taking corrective action if the determining step determines that corrective action is required, such as switching shunt capacitors or reactors, adjusting generator set points, employing Flexible AC Transmission System (FACTS) or energy storage devices, or controlling tap-changing transformers, for example, during operation of the system.

The modeling step may include specifying other buses in the system as PV buses or PQ buses, in addition to the AQ bus and swing bus.

The foregoing method may be repeated a plurality of times during a day of operation of the electrical power generation and distribution system. The method may be repeated after a predetermined interval, such as every five minutes, or every thirty seconds, for example, during operation of the system.

The steps of modeling, solving, repeating, calculating, and determining could be carried out by one or more programmable computers programmed to carry out those steps, as one of skill in the art would understand. The power flow problem can be modeled based on a snapshot of a state of the electrical power generation and distribution system. The snapshot may be generated from data supplied to the one or more programmable computers by a plurality of meters associated with the plurality of buses. Optionally, fewer than all of the buses may be associated with meters.

In this disclosure, Algorithm 1 and Algorithm 2 use the conventional power flow method up to the point at which it no longer converges, after which point, the novel AQ-bus power flow method is used. It should be understood that in its practical application the AQ-bus power flow method can be used by itself, and the conventional power flow method is not necessarily used at all.

In addition to its application in the operation of existing power systems, the novel AQ-bus power flow method can be used for identifying and correcting potential voltage instability problems while planning and designing power grid systems or future expansions of existing power grid systems.

VI Conclusions

In this disclosure, we have developed a general-purpose power flow method that directly eliminates the matrix singularity issues that arise in PV curve calculations by introducing a new AQ-bus type. The elimination of the singularity using the AQ-bus method was motivated using a classical two-bus system, and a framework was developed to include multiple load buses and multiple generators in the computation of PV curves. We present two algorithms for practical implementation of the method and demonstrated both algorithms on a small two-area system. Finally, we extend the method to a 48-machine system to show its scalability and applicability to steady-state voltage stability margin calculation and contingency analysis.

This method provides many advantages in the computation of steady-state voltage stability margins because it does not have numerical issues at the maximum power transfer point. Thus, power system operators can calculate the stability margins using this method far more reliably and quickly than a conventional power flow method.

The references identified by numbers in brackets above are:

[1] H.-D. Chiang, A. Flueck, K. Shah, and N. Balu, "CPFLOW: a practical tool for tracing power system steady-state stationary behavior due to load and generation variations," IEEE Transactions on Power Systems, vol. 10, no. 2, pp. 623-634, 1995.

[2] M. Klein, G. J. Rogers, and P. Kundur, "A fundamental study of inter-area oscillations in power systems," IEEE Transactions on Power Systems, vol. 6, pp. 914-921, August 1991.

[3] B. Stott, "Review of load-flow calculation methods," Proceedings of the IEEE, vol. 62, no. 7, pp. 916-929, 1974.

[4] V. Ajjarapu, Computational Techniques for Voltage Stability Assessment and Control. New York: Springer Science+Business Media, 2006.

[5] F. Bourgin, G. Testud, B. Heilbronn, and J. Verseille, "Present Practices and Trends on the French Power System to Prevent Voltage Collapse," IEEE Transactions on Power Systems, vol. 8, no. 3, pp. 778-788, 1993.

[6] C. Taylor, Power System Voltage Stability. 1 em plus 0.5 em minus 0.4 em New York: McGraw-Hill, 1994.

[7] T. Van Cutsem and C. Vournas, Voltage Stability of Electric Power Systems. New York: Springer Science+Business Media, 1998.

[8] A. Kurita and T. Sakurai, "The power system failure on Jul. 23, 1987 in Tokyo," in Proc. of the 27th Conf. on Decision and Control, 1988.

[9] J. H. Chow, R. Galarza, P. Accari, and W. Price, "Inertial and slow coherency aggregation algorithms for power system dynamic model reduction," IEEE Trans. on Power Systems, vol. 10, no. 2, pp. 680-685, 1995.

[10] Y. Guo, B. Zhang, W. Wu, Q. Guo, and H. Sun, "Solvability and Solutions for Bus-Type Extended Load Flow," Electrical Power and Energy Systems, vol. 51, pp. 89-97, 2013.

[11] K. Iba, H. Suzuki, M. Egawa, and T. Watanabe, "Calculation of critical loading condition with nose curve using homotopy continuation method," IEEE Transactions on Power Systems, vol. 6, no. 2, pp. 584-593, 1991.

[12] G. Andersson, P. Donalek, R. Farmer, N. Hatziargyriou, I. Kamwa, P. Kundur, N. Martins, J. Paserba, P. Pourbeik, J. Sanchez-Gasca, R. Schulz, A. Stankovic, C. Taylor, and V. Vittal, "Causes of the 2003 major grid blackouts in North America and Europe, and recommended means to improve system dynamic performance," IEEE Transactions on Power Apparatus and Systems, vol. 20, no. 4, pp. 1922-1928, November 2005.

While specific embodiments of the invention have been shown and described in detail to illustrate the application of the principles of the invention, it will be understood that the invention may be embodied otherwise without departing from such principles.

What is claimed is:

1. A method of identifying and correcting potential voltage instability caused by a contingency in an electrical power generation and distribution system, the electrical power generation and distribution system comprising a plurality of buses, the plurality of buses comprising at least one generator bus and at least one load bus, each configuration having a maximum loadability, the method comprising the steps of:

modeling a power flow problem by specifying one of the plurality of buses as an AQ bus, specifying another of the plurality of buses as a swing bus, and specifying an angular separation between the AQ bus and the swing bus;

solving the power flow problem to yield a power transfer from generation to load;

repeating the solving step using a new angular separation in every repetition of the solving step until a maximum power transfer from generation to load is determined;

calculating a voltage stability margin by calculating the difference between the maximum power transfer and the power transfer at the current operating condition;

determining whether corrective action is required by comparing the voltage stability margin to a safety margin; and taking corrective action if the determining step determines that corrective action is required, the corrective action being selected from the group of switching shunt capacitors, switching reactors, adjusting generator set points, employing Flexible AC Transmission System (FACTS) devices, employing energy storage devices, and controlling tap-changing transformers.

2. The method of claim 1 further comprising the step of repeating the modeling, solving, repeating, calculating, determining, and taking steps a plurality of times during a day of operation of the electrical power generation and distribution system.

3. The method of claim 1 wherein the power flow problem is modeled based on a snapshot of a state of the electrical power generation and distribution system.

4. The method of claim 1 wherein the modeling, solving, repeating, calculating, and determining steps are carried out by one or more programmable computers programed to carry out the modeling, solving, repeating, calculating, and determining steps.

5. The method of claim 2 wherein the plurality of times are separated by a predetermined interval.

6. The method of claim 3 wherein the snapshot is generated from data supplied by a plurality of meters associated with the plurality of buses.

7. The method of claim 1 wherein the modeling step further comprises specifying a plurality of buses as PV buses.

8. The method of claim 1 wherein the modeling step further comprises specifying a plurality of buses as PQ buses.

9. The method of claim 1 wherein the modeling step further comprises specifying a plurality of buses as PV buses and another plurality of buses as PQ buses.

10. The method of claim 3 wherein the snapshot is generated from data supplied to the one or more programmable computers by a plurality of meters associated with the plurality of buses.

* * * * *